US010635572B2

United States Patent
Yabusaki

(10) Patent No.: US 10,635,572 B2
(45) Date of Patent: Apr. 28, 2020

(54) SYSTEM AND METHOD FOR MICROSERVICE VALIDATOR

(71) Applicant: Hitachi, Ltd., Chiyoda-ku, Tokyo (JP)

(72) Inventor: Hitoshi Yabusaki, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 79 days.

(21) Appl. No.: 15/968,180

(22) Filed: May 1, 2018

(65) Prior Publication Data

US 2019/0340108 A1 Nov. 7, 2019

(51) Int. Cl.
G06F 11/36 (2006.01)
G06F 8/61 (2018.01)

(52) U.S. Cl.
CPC .......... *G06F 11/3664* (2013.01); *G06F 8/61* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,832,275 A * | 11/1998 | Olds | ............ | G06F 8/656 717/173 |
| 8,046,755 B2 * | 10/2011 | Gaa-Frost | ............ | G06F 8/60 717/168 |
| 8,166,448 B2 * | 4/2012 | Mitra | ............ | G06F 8/20 717/100 |
| 8,448,131 B2 * | 5/2013 | Ottavi | ............ | G06F 11/3672 717/104 |
| 9,329,915 B1 * | 5/2016 | Chandrasekharapuram | ............ | G06F 11/3414 |
| 9,383,984 B2 * | 7/2016 | Mantripragada | ............ | G06F 8/60 |
| 10,108,534 B2 * | 10/2018 | Vyas | ............ | G06F 11/14 |
| 10,140,206 B2 * | 11/2018 | Sapozhnikov | ............ | G06F 11/3668 |
| 10,275,329 B2 * | 4/2019 | Chen | ............ | G06F 11/2038 |
| 10,289,538 B1 * | 5/2019 | Dwivedi | ............ | G06F 11/36 |
| 10,341,438 B2 * | 7/2019 | Jain | ............ | G06F 11/07 |
| 2007/0157195 A1 * | 7/2007 | Gaa-Frost | ............ | G06F 8/60 717/174 |

(Continued)

OTHER PUBLICATIONS

De Camargo, André, et al. "An architecture to automate performance tests on microservices." Proceedings of the 18th International Conference on Information Integration and Web-based Applications (Year: 2016).*

(Continued)

*Primary Examiner* — Matthew J Brophy
(74) *Attorney, Agent, or Firm* — Procopio, Cory, Hargreaves & Savitch LLP

(57) ABSTRACT

Example implementations described herein are directed to systems and methods for validating and deploying microservices. In an example implementation, a plurality of similarities are calculated between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

16 Claims, 11 Drawing Sheets

(56) References Cited

U.S. PATENT DOCUMENTS

| | | | |
|---|---|---|---|
| 2008/0295064 A1* | 11/2008 | Mitra | G06F 8/20 717/100 |
| 2010/0095276 A1* | 4/2010 | Ottavi | G06F 11/3664 717/125 |
| 2011/0276941 A1* | 11/2011 | Oi | G06F 8/65 717/121 |
| 2011/0276945 A1* | 11/2011 | Chasman | G06F 11/3604 717/124 |
| 2012/0079502 A1* | 3/2012 | Kwan | G06F 8/71 718/106 |
| 2012/0266135 A1* | 10/2012 | Mansour | G06F 11/3648 717/124 |
| 2014/0130036 A1* | 5/2014 | Gurikar | G06F 8/61 717/176 |
| 2014/0365198 A1* | 12/2014 | Kuell | G06F 30/20 703/17 |
| 2015/0052402 A1* | 2/2015 | Gurumurthy | G06F 11/3688 714/38.1 |
| 2015/0199188 A1* | 7/2015 | Mantripragada | G06F 8/60 717/101 |
| 2015/0331708 A1* | 11/2015 | Bala | G06F 11/1402 718/1 |
| 2016/0034269 A1* | 2/2016 | Furuichi | H04L 67/34 717/169 |
| 2016/0086069 A1* | 3/2016 | Tajima | G06F 8/654 358/1.14 |
| 2016/0124742 A1* | 5/2016 | Rangasamy | H04L 47/70 717/103 |
| 2016/0147646 A1* | 5/2016 | Raghavan | G06F 11/3688 714/38.1 |
| 2017/0052778 A1* | 2/2017 | Furuichi | H04L 67/34 |
| 2017/0139816 A1* | 5/2017 | Sapozhnikov | G06F 16/00 |
| 2017/0228248 A1* | 8/2017 | Bala | G06F 11/1402 |
| 2018/0077012 A1* | 3/2018 | Tellado | H04L 43/10 |
| 2018/0107586 A1* | 4/2018 | Vyas | G06F 9/455 |
| 2018/0321993 A1* | 11/2018 | McClory | G06F 9/546 |
| 2019/0018671 A1* | 1/2019 | Zhu | H04L 43/04 |
| 2019/0026091 A1* | 1/2019 | Gao | G06F 11/301 |
| 2019/0034322 A1* | 1/2019 | Vyas | G06F 8/65 |
| 2019/0158465 A1* | 5/2019 | Ahuja | H04L 63/20 |
| 2019/0235993 A1* | 8/2019 | Modeel | G06F 11/3696 |
| 2019/0243748 A1* | 8/2019 | Rajagopalan | G06F 11/3664 |
| 2019/0278570 A1* | 9/2019 | De Smet | G06F 8/315 |
| 2019/0303187 A1* | 10/2019 | Vu | G06F 9/45558 |
| 2019/0324897 A1* | 10/2019 | Subramanian | G06F 11/3684 |
| 2019/0332522 A1* | 10/2019 | Leydon | G06F 11/3696 |
| 2020/0026641 A1* | 1/2020 | Rajagopalan | G06F 11/3676 |

OTHER PUBLICATIONS

Chen, Tse-Hsun, et al. "Analytics-driven load testing: An industrial experience report on load testing of large-scale systems." 2017 IEEE/ACM 39th International Conference on Software Engineering: Software Engineering in Practice Track (ICSE-SEIP). IEEE, 2017. (Year: 2017).*

* cited by examiner

APPLICATION CATALOGS 31

| Catalog Names | Definitions | Test Code Repository Links |
|---|---|---|
| Catalog 1 | services:<br>- noSQL:<br>  - name: noSqlDb:V1.0<br>    Image: application_repository/noSqlDb:v1.0<br>- logcollecotr:<br>  - name: logcollecotr:v1.0<br>    Image: application_repository/logcollecotr:v1.0<br>- seachViewer:<br>  - name: searchViewer:v1.0<br>    Image: application_repository/searchViewer:v1.0<br>- messageQueue:<br>  - name: messageQueue_a:v1.0<br>    Image: application_repository/messageQueue_a:v1.0 | urls:<br>- url: https://testcode_repository/catalog1/ |
| Catalog 2 | services:<br>- noSQL:<br>  - name: noSqlDb:v1.1<br>    Image: application_repository/noSqlDb:v1.1<br>- logcollecotr:v1.1<br>  - name: logcollecotr:v1.1<br>    Image: application_repository/logcollecotr:v1.1<br>- searchViewer:<br>  - name: searchViewer:v1.0<br>    Image: application_repository/searchViewer:v1.0<br>- messageQueue:<br>  - name: messageQueue_a:v1.0<br>    Image: application_repository/messageQueue_a:v1.0 | urls:<br>- url: https://testcode_repository/catalog2/ |
| Catalog 3 | services:<br>- noSQL:<br>  - Name: noSqlDb:v1.1<br>    Image: application_repository/noSqlDb:v1.1<br>- logcollecotr:<br>  - name: logcollecotr:v1.1<br>    Image: application_repository/logcollecotr:v1.1<br>- seachViewer:<br>  - name: searchViewer:v1.0<br>    Image: application_repository/searchViewer:v1.0<br>- messageQueue:<br>  - Name: messageQueue_b:v1.0<br>    Image: application_repository/messageQueue_b:v1.0 | urls:<br>- url: https://testcode_repository/catalog3/ |
| ... | ... | ... |

FIG. 3

ABSTRACT TEMPLATES  33

| Abstract Template Names | Catalog Names | ISPilotApplication |
|---|---|---|
| NoSQL based search viewer stack with messaging queue ingestor | Catalogs:<br>- catalog1<br>- catalog2<br>- catalog3 | False |
| NoSQL based search viewer stack with ETL ingestor | Catalogs:<br>- catalog4<br>- catalog5<br>- catalog6 | False |
| Analytics template for NoSQL data lake | ... | ... |
| Pilot Applications | Catalogs:<br>- catalog11<br>- catalog12<br>- catalog13 | True |

FIG. 4

ACCESS PATTERNS  34

| Access Pattern Names | Patterns |
|---|---|
| Pattern 1 | Accesses:<br>- numberOfSessions: 20<br>- numberOfRequestsPerSecond: 10<br>- Ingested Data: https://IngestedData/pattern1 |
| Pattern 2 | Accesses:<br>- numberOfSessions: 100<br>- numberOfRequests Per Second: 35<br>- Ingested Data: https://IngestedData/pattern2 |
| Pattern 3 | ... |

FIG. 5

SYSTEM ENVIRONMENTS 35

| Systems Environment Names | Catalog Names | Access Pattern Names | Test Results |
|---|---|---|---|
| pilot_environment_1 | Catalog 11 | Pattern 1 | { An_authorized_user_should_be_logged_in: True (Success) Max_Number_of_entry_in_message_Queue: 2 (Success) Number_of_entry_in_NoSQL: 25 (Success) } |
| pilot_environment_1 | Catalog 11 | Pattern 2 | { An_authorized_user_should_be_logged_in: True (Success) Max_Number_of_entry_in_message_Queue: 5 (Success) Number_of_entry_in_NoSQL: 50 (Success) } |
| pilot_environment_1 | Catalog 12 | Pattern 1 | { An_authorized_user_should_be_logged_in: True (Success) Max_Number_of_entry_in_message_Queue: 250 (Failed) Number_of_entry_in_NoSQL: 25 (Success) } |
| ... | ... | ... | ... |
| pilot_environment_1 | Catalog 1 | Pattern 1 | { An_authorized_user_should_be_logged_in: True (Success) Max_Number_of_entry_in_message_Queue: 221 (False) Number_of_entry_in_NoSQL: 25 (Success) } |
| ... | ... | ... | ... |

FIG. 6

SYSTEM SIMILARITY 36

| System Environment Names 1 | System Environment Names 2 | Similarity |
|---|---|---|
| user_environment_1 | pilot_environment_1 | 90% |
| user_environment_1 | pilot_environment_2 | 80% |
| ... | ... | ... |

FIG. 7

COMBINATIONS 37

| Abstract Template Names | Catalog Names | Access Pattern Names | System Environment Names | Test Results |
|---|---|---|---|---|
| NoSQL based search viewer stack with messaging queue ingestor | Catalog 1 | Pattern 1 | pilot_environment_1 | { An_authorized_user_should_be_logged_in: True (Success) Max_Number_of_entry_in_message_Queue: 221 (False) Number_of_entry_in_NoSQL: 25 (Success) } |
| NoSQL based search viewer stack with messaging queue ingestor | Catalog 2 | Pattern 2 | pilot_environment_1 | { An_authorized_user_should_be_logged_in: True (Success) Max_Number_of_entry_in_message_Queue: 10 (Success) Number_of_entry_in_NoSQL: 25 (Success) } |
| NoSQL based search viewer stack with messaging queue ingestor | Catalog 3 | Pattern 1 | pilot_environment_1 | { An_authorized_user_should_be_logged_in: True (Success) Max_Number_of_entry_in_message_Queue: 10 (Success) Number_of_entry_in_NoSQL: 25 (Success) } |
| ... | ... | ... | ... | ... |

FIG. 8

SYSTEM AND METHOD FOR MICROSERVICE VALIDATOR

BACKGROUND

Field

The present disclosure relates generally to systems and methods for microservices and more specifically, to a validator for microservices.

Related Art

Microservices generally refer to a type of modular application architecture where components or services are combined to deploy large applications. Each component or service is typically developed and/or maintained separately and then assembled, tested, and deployed for a particular application or environment. Typically, environments that execute applications based on microservices can require significant user involvement for testing and configuration to ensure compatible combinations of components or services.

Related art implementations orchestrate and run container-based applications with a microservice architecture that assemble components, install an application in an environment, and then attempt to diagnose and resolve faults. In a related art example, validators are used as post-deployment auto-diagnostic operations that detect faults and attempt to self-heal the faults after deployment in a user's environment. Post-deployment validators generally have limited self-healing capabilities and can cause system instability. For example, changing input parameters through self-healing does not generally resolve problems with incompatible microservices or version differences that create conflicts and faults.

Further, a fault free installation of an application does not assure that the installed application or system will perform optimally. The capabilities of a user's system environment impact the performance and operability of an installed application with microservices. Once a user environment is configured and instantiated, deploying pre-configured applications with microservices can require considerable and costly changes to optimize the user environment. For example, open source based microservices may be combinable and installed successfully in a user environment but improper or sub-optimal combinations of components cause severe performance issues such as memory leaks, network bandwidth waste, or network connectivity instability due to an environment characteristic.

Other related art examples use pre-configured system environments for deploying installation of assembled components. However, enterprise systems and large scale deployments typically involve a variety of system environments for satisfying different business requirements. Thus, for a user's system environment to satisfy business requirements (e.g., response time, availability, etc.) system environment difference and access patterns need to be considered prior to deployment of applications with microservices.

SUMMARY

Performance of a user environment can vary drastically when a combination of microservices is deployed. Validating the suitability of the combination of microservices prior to deployment in the user's environment can improve performance, save costly down time, and avoid intensive troubleshooting or reconfiguration.

According to an example implementation, a microservice validator process includes a multi-phases approach to test catalogs of applications in different pilot environments and validate the applications for the user's environment. A learning phase includes creating multiple combinations of application templates, different system environment configurations, and a variety of access patterns. An action phase selects an optimal application template based on a user's specified environment and access patterns.

Aspects of the present disclosure include a method to validate and deploy a microservice that optimizes performance with a user environment. In an example implementation, the method calculates a plurality of similarities between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

Aspects of the present disclosure can include a system with a memory and processing device configured to calculate a plurality of similarities between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

Aspects of the present disclosure can include a non-transitory computer readable medium storing instructions for that include calculating a plurality of similarities between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

Aspects of the present disclosure can include a means for calculating a plurality of similarities between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

BRIEF DESCRIPTION OF DRAWINGS

FIG. 3 illustrates an example application catalog table in accordance with an example implementation.

FIG. 4 illustrates an example application deployment template table in accordance with an example implementation.

FIG. 5 illustrates an example access pattern table in accordance with an example implementation.

FIG. 6 illustrates an example system environment table in accordance with an example implementation.

FIG. 7 illustrates an example system similarity table in accordance with an example implementation.

FIG. 8 illustrates an example combinations table in accordance with an example implementation.

DETAILED DESCRIPTION

Figure 1:
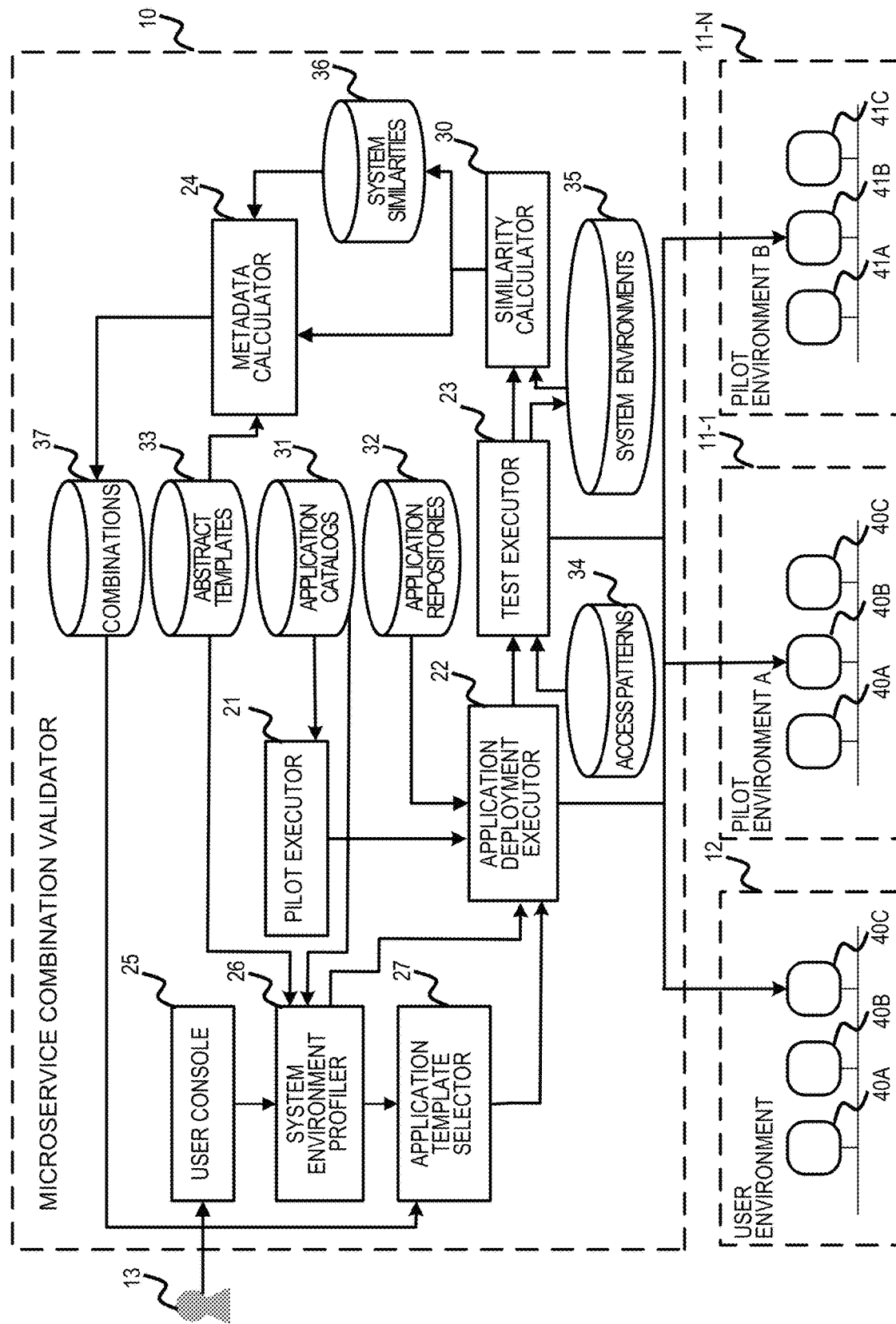
FIG. 1 illustrates an example microservice combination validation system in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

According to an example implementation, a microservice validator process includes a multi-phase approach to test catalogs of applications in different pilot environments and validate the applications for the user's environment. A learning phase includes creating multiple combinations of application templates, different system environment configurations, and a variety of access patterns. An action phase selects an optimal application template based on a user's specified environment and access patterns. A microservice combination validator engine deploys multiple application templates and runs tests on one or more pilot environments with one or more access patterns using abstract templates to test combinations of catalogs to validate with access patterns and system environments. The microservice combination validator can calculate similarities between environments to identify compatible combinations tested in similar environments.

In an example, a combination of open sources microservices may use a Transmission Control Protocol (TCP) port that is incompatible with a configuration of the user environment (e.g., blocked by a corporate proxy). Deploying the combination of open sources microservices in their user environment can cause the entire user environment to lose network connectivity, blacklist the user environment within the corporate network, and render the user environment inoperable for the user. By validating the combination of open sources microservices in a pilot environment, the user can avoid lost productivity.

Aspects of the present disclosure include a method to validate and deploy a microservice that optimizes performance with a user environment. In an example implementation, the method calculates a plurality of similarities between a user environment and multiple pilot environments from application deployment test results. The test results are based on the compatibility of catalogs of applications with each of the pilot environments. A list or table of validation information is presented with one or more of the catalogs of applications that are indicated as compatible and similar to the user environment based on the calculated similarities. The user can select catalog from the list that is deployed in the user environment.

An example implementation includes determining the application deployment test results during the learning phase by obtaining source code and objects for applications from the catalogs of applications from an application repository, deploying multiple pilot environments with the applications from the catalogs of applications, testing the applications for each of the pilot environments with one or more access patterns, and determining a pilot similarity between the multiple pilot environments based on the test results.

Calculating the plurality of similarities can include determining a percentage of consistence for a test item of the test results between the user environment and the multiple pilot environments. The test results can be stored as metadata for each pilot environment that indicates an abstract template, pilot similarities, an access pattern, and the pilot environment associated with the testing. In an example, the list can includes, for each application, an access pattern, a system environment name, the calculated similarity, and test results associated the application.

Multiple open source options commonly exists with the same or overlapping functions that do not operate consistently in different environments when combined with different services. In an example, a messaging queue may be required based on a set of business requirements but different versions of the same open source options may not be suitable for certain access patterns and system environments (e.g., low latency version verses a high volume version).

In an example implementation, the test results use a pilot application as the catalog of applications. A pilot application is an application to profile user environments and/or pilot environments. The test results validate whether the combination satisfied the test parameters in the pilot environment prior to deployment of that combination in the user environment. For example, the action phase determines application deployment test results for the user environment based on deploying one or more pilot applications in the user environment, and testing the one or more pilot applications in the user environment with one or more access patterns.

In the action phase, a user, via a graphical user interface (GUI), can specify parameters (e.g., access patterns and a catalog) to determine a set of combinations in view of the system similarities. During the action phase, the microservice combination validator selects application templates applicable that are similar to the user's environment and specified access patterns. The user can identify an appropriate application combination from a list or table of validation information based on the application template that indicates optimal compatibility and performance with the user's environment. Thus, a combination is validated before deploying the user's environment reducing the risk of destabilizing the user environment.

An example aspect of the present disclosure includes a microservice combination validator that can maintain a repository of tested combinations of microservices for different user environments with different configurations and uses (e.g., access patterns). The repository of tested combinations can be used to determine the similarity between tested combinations with a particular instantiated user environment.

Combinations can be tested for a variety of specific configurations and/or uses (e.g., access patterns) by deploying permutations of the combinations and calculating similarities between the tested combinations and the user environment. The microservice combination validator can be used to validate that combinations of microservice are compatible with similar environments and recommend new combinations of microservice to optimize deployments. The microservice combination validator is adaptable for different types environment and provides scalable on-demand resources for enterprise deployments to avoid failed installations and optimize performance of microservices.

FIG. 1 illustrates an example microservice combination validation 10 system in accordance with an example implementation. The microservice combination validator 10 can include executable application processes and/or microservices, storage (e.g., short-term memory, data stores, RAM, ROM, and/or the like), and communication means for interacting with multiple environments (e.g., pilot environments 11-1~11-N, a user environment 12, etc.) and/or virtual resources (e.g., 40A, 40B, 40C). In an example implementation, microservice combination validator 10 can execute a main flow of Application Program Interface (API) calls with the data but is not limited thereto. It should be noted that the illustrated flow of API calls is exemplary and may include additional flows with differing components and/or data. Further, exemplary interactions between the components of the microservice combination validator 10 are included but not limited thereto.

In an example implementation, the microservice combination validator 10 includes a pilot executor 21, an application deployment executor 22, a test executor 23, a metadata calculator 24, a user console 25, a system environment profiler 26, an application template selector 27, a combination selector 28, and a similarity calculator 30. The microservice combination validator 10 includes one or more data stores, for example, application catalogs 31, application repositories 32, abstract templates 33, access patterns 34, system environments 35, system similarities 36, and combinations 37.

In an example, an enterprise system can employ the microservice combination validator 10 to test combinations of components with differently configured environments (e.g., pilot environments 11-1 through 11-N), generate test results (e.g., system environments 35) using different access patterns 34, and store a repository of the combinations 37. The combinations 37 can be used with a user environment 12 to deploy microservices that were validated in a similar pilot environments 11-1 with similar constraints and requirements (e.g., access patterns 34) based on the test results.

The pilot executor 21 can create multiple pilot environments 11-1 through 11-N. The microservice combination validator 10 is connected to pilot environments 11-1~11-N and a user environment 12. The pilot environment 11 and the user environment 12 can include several virtual resources 40A, 40B and 40C coupled via a network.

The multiple pilot environments 11-1~11-N deploy different combinations of applications based on application catalogs 31 in differently configured pilot environments 11 using the application deployment executor 22 and test executor 23 to judge the performance with different access patterns 34.

The application catalogs 31 are templates of application system which can include one or more application components or microservices, as further discussed in reference to FIG. 3. The application repositories 32 are objects of the applications. For example, an object can be a container image, and the application repositories 32 can be container repositories.

The abstract templates 33 (e.g., an application deployment template) can include high level definitions of different application systems and/or differently configured application systems, as further discussed in reference to FIG. 4. For example, abstract templates 33 can be pre-defined (e.g., by an enterprise system administrator) or constructed on-demand (e.g., in response to an API call from a software vendor). The access patterns 34 are lists of application request patterns, as further discussed in reference to FIG. 5.

The microservice combination validator 10 supports a multi-phase process for validating and deploying microservices. In a learning phase, the microservice combination validator 10 creates combinations of application templates, validated system environments and validated access patterns, as further discussed in reference to FIG. 9. In an action phase, the microservice combination validator 10 selects application templates applicable for user's environment and access patterns, as further discussed in reference to FIG. 10.

In an example implementation, permutations of different application systems are instantiated in the pilot environments 11 to validate (or invalidate) the operability of different configurations and test performance using access patterns 34. The system environments 35 includes information about results of tests in the pilot environments 11 and/or the user environments 12, as further discussed in reference to FIG. 6.

The pilot environments 11-1 and 11-2 are used to deploy and test applications during the learning phase that generate the system environments 35. Different pilot environments 11 can have different characteristics (e.g., computing resource limitations, CPUs, memory size, storage size, I/O speed, network bandwidth, network proxy, firewall, stability of network, etc.). In some implementations, pilot environments 11-1 and 11-2 can be used for different platforms such as container clusters in different countries. For example, the pilot environment 11-1 can be executed on a local server, a cloud computing service, multiple cloud computing service, a private data center, multiple private data centers, etc.

The system similarities 36 are used to compare the similarity among the pilot environments 11 and/or user environments 12, as further discussed in reference to FIG. 7. The combinations 37 indicate the successful and failed combinations of catalogs, access patterns, and system environments as further discussed in reference to FIG. 8.

The user environment 12 is a system environment where a user 13 runs applications. Once a user environment 12 is configured and instantiated, re-configuring the user environment 12 for different applications with microservices can require considerable time and cost. In an example implementation, a user 13, via the user console 25, can specify parameters (e.g., access patterns and a catalog) to determine a list of the validated combinations 37 in view of the system similarities 36. During the action phase, the microservice combination validator 10 selects application templates applicable that are similar to the user's environment and specified access patterns. Accordingly, an appropriate application is selected using the application template that indicates optimal compatibility and performance. Further, the application is validated before deploying the user's environment reducing the risk of destabilizing the user environment 12.

Figure 2:
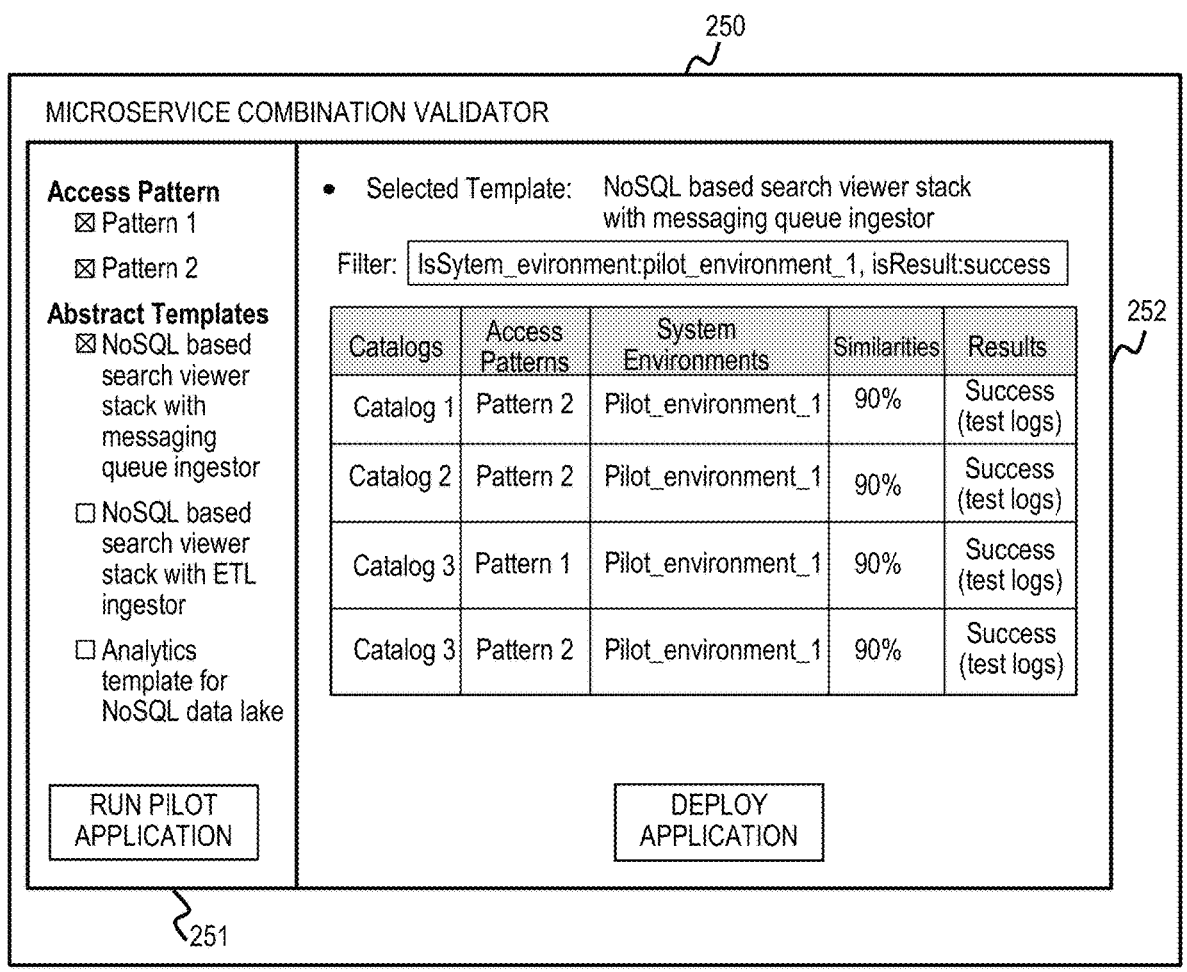
FIG. 2 illustrates an example interface in accordance with an example implementation.

FIG. 2 illustrates an example interface 250 in accordance with an example implementation. In an example implementation, interface 250 is a user console 25 of the microservice combination validator 10 with a graphical user interface (GUI). In an example, GUI 250 can include a user pilot pane 251 and a user deployment pane 252. The user pilot pane 251 can include a list of access patterns and a list of abstract templates for the user to select. The user pilot pane 251 allows the user to select multiple access patterns and abstract templates that are used to construct combinations and return validation information in the user deployment pane 252.

For example, the user can specify an access patterns that indicates the number of sessions or requests per second that the application in the user environment is expected to support (e.g., based on business requirements, service level agreements, etc.). The user can select list of abstract templates or application deployment templates that describe the high level application systems (e.g., NoSQL based search viewer stack with messaging queue ingestor, NoSQL based search viewer stack with extract-transform-load (ETL) ingestor, Analytics template for NoSQL data lake) to be deployed in the user's environment, as further discussed in reference to FIG. 4.

The user can select a "Run Pilot Application" button to trigger the system environment profiler 26. The system environment profiler 26 returns a set of validation information that is presented in the user deployment pane 252 including a list of catalogs, access patterns, system environments, similarities, and results.

The validation information in deployment pane 252 informs the users which combinations of a catalog and a pattern are successful or error-prone in similar (and dissimilar) system environments. For a large number of combinations, the user deployment pane 252 can filter and/or rank the validated information based on the results and/or similarity values.

Based on the pattern(s) and abstract template(s) selected in user pilot pane 251, the system environment profiler 26 identifies a number of combinations 37. For example, the combinations include application catalogs for the selected access pattern based on the selected patterns (e.g., Pattern 1 and Pattern 2) in user pilot pane 251, as further discussed in reference to FIG. 5. Each abstract template (e.g., abstract templates 33) defines a relationship with one or more catalogs of applications as further discussed in reference to FIG. 4.

A combination is based on a catalog, an access pattern, and a system environment. For each combination, the user deployment pane 252 presents validation information with a similarity value and a test result in view of the user environment of the requesting user 13. The system environments are returned based on the list of pilot environments and user environments.

A calculated similarity value is presented for each combination of catalog, access pattern and system environment to indicate how similar each combination with the system environment is to user environment 12, as further discussed in reference to FIG. 7. The results are results of tests for each combination (e.g., a catalog, an access pattern, a system environment) that indicate an overall compatibility with the user environment 12.

A failed result indicates the combination is not compatible with the user environment. Incompatibility indicated by a failed result for a combination may be related to a configuration of the user environment 12, the parameters selected in user pilot pane 251, incompatible versions, etc. For example, an access pattern 2 may specify 100 sessions but the user environment with the catalog 1 may only be able to support 20 sessions. Thus, the user deployment pane 252 can indicate pattern 2 with catalog 1 and Pilot_environment_1 with a failed result.

The test logs can provide insights for to the user regarding types of compatibility issues, performance issues, or errors that occur in similar (or un-similar) system environments with the associated combination. According to an example implementation, the user deployment pane 252 allows a user to select results to display test logs for the combination. For example, the user can review the test logs and determine the number of supported sessions caused the combination to fail. In another example, the user may review the test logs and identify that a configuration of the user environment is a cause of the failure and choose not to proceed with the combination to avoid the cost and trouble of reconfiguring the user environment.

In another example, test logs can indicate a proxy setting or version is a source of failure with the combination of microservices that use a particular TCP port. By reviewing the test logs, the user can determine whether changing the proxy settings or version in the user's environment is effective. Alternatively, the validation information can be used to select a validated combination of microservices that use a different TCP port or are compatible with the proxy setting or version, as further discussed in reference to FIG. 10.

FIGS. 3-8 illustrate data used in the microservice combination validator 10. An aspect of the example implementation is described in reference to combinations of NoSQL (yaml/json) communications. However, the scope of the example implementations is not limited to any specific formats, and the microservice combination validator 10 can support other types of combinations without departing from the inventive scope. For example, but not by way of limitation, other combinations can be validated can be any format such as one single yaml/json format, but are not limited thereto.

FIG. 3 illustrates an example application catalog 31 table in accordance with an example implementation. The application catalogs 31 indicate templates of application system which can include one or more application components or microservices. The application catalogs 31 can be predefined, defined by users, or defined through API call from other systems. The application catalog 31 can be stored in other systems and the microservice combination validator 10 may access them through API.

In an example implementation, the application catalogs 31 include a catalog name, a set of definitions, and test code repository links. The catalog names are names of a catalog. Definitions are definitions of application system. In an example, definitions can be formatted as container compose file or manifest files of container clusters. Test code repository links are urls where test codes are stored. For example, catalog 1 can be associated with definitions for services noSQL, logcollecotr, seachViewer, messageQueue, etc. that indicate the version and are to be tested with code in the repository.

FIG. 4 illustrates an example application deployment template 33 table in accordance with an example implementation. The abstract templates 33 are high level definitions of application systems. The abstract templates 33 can be predefined, defined by users, or defined through API call from other systems. The abstract templates 33 include abstract template names, catalog names, and isPilotApplication. The abstract template names are names of the abstract templates. The catalog names are groups of same or similar functionality catalog names.

For example, for "NoSQL based search viewer stack with messaging queue ingestor," there can be several options of implementation or application stacks. An abstract template can include one or more catalog names (e.g., catalog1, catalog2, etc). IsPilotApplication is a Boolean field that indicates an abstract template is a pilot application (e.g., true) or not a pilot application (e.g., false). A pilot application is an application to profile user environments and pilot environments. From test results of pilot applications, the microservice combination validator 10 determines pilot environments 11 that are similar to a user environment 12.

FIG. 5 illustrates an example access pattern 34 table in accordance with an example implementation. The access patterns 34 are lists of application request patterns. The access patterns 34 can be pre-defined, defined by users, or defined through API call from other systems. Access patterns include access pattern names and patterns. The access pattern names are names of access patterns. The patterns are patterns of access requests used to generate requests for deployed application in pilot environments 11 and/or user environments 12 during the learning phase.

In an example, the microservice combination validator 10 can trigger access from remote sources (e.g., a http request, publishing to a messaging queue, subscribing from a messaging queue, etc.). For example, patterns can include a numberOfSessions, numberOfRequestsPerSecond, IngestedData, etc. The numberOfSessions can indicate a number of connected sessions generated at the same time that are supported by a deployed application in a pilot environment 11 and/or a user environment 12. The numberOfRequestsPerSecond can indicate numbers of requests generated that are supported by a deployed application per second in a pilot environment 11 and/or a user environment 12. The IngestedData is the url of the data used to generate requests. Ingested data can include, for example, picture image data, JavaScript Object Notation (JSON) format data, etc.

FIG. 6 illustrates an example system environments 35 table in accordance with an example implementation. The system environments 35 are created on the basis of test results in the pilot environments 11 and/or user environments 12. The system environments 35 can include system environment names, catalog names, access pattern names, and test results. For example, system environment names can be the names of pilot environments and user environments. The catalog names and access pattern names refer to the related tables, as further discussed in reference to FIGS. 4 and 5.

The test results are results of the test of applications deployed on the basis of catalogs with access patterns on the system environments. In an example implementation, the results of tests include results of backend test, front end test, end-to-end test, etc. In an example, system environments are defined with computing resources such as number of CPU cores, memory size, TCP throughput, Input/Outputs per second (IOPS), and performance statistics (e.g., delays, Round Trip Time (RTT), etc.).

Test results from a pilot environment 11 that is very similar (e.g., some or all of the same system environment characteristics) to the user environment 12 is an indicator of success and/or failure if the combination is deployed in the user environment 12. The test results validate whether the combination satisfied the test parameters in the pilot environment prior to deployment of that combination in the user environment.

Validated test results for a combination in a similar system environment may ultimately be unsuccessful in the user environment 12. The strength of the similarity between the pilot environment and user environment improve the validation result. Verification occurs when the validated combination is deployed in the user environment 12. For example, validated combinations when deployed in the user environment 12 can suffer from timeout issues due to corporate proxy, emitting errors due to under layers resources such as kernel difference, container clusters, etc. The test results for system environments of a combination (catalogs, access patterns, pilot environment) can indicate errors due to access request patterns, company's proxies, country's proxy, firewalls etc. Catalogs that properly work in certain combinations of access patterns and system environments are identified by the test results.

FIG. 7 illustrates an example system similarity 36 table in accordance with an example implementation. The system similarities 36 are the similarity among the pilot environments 11 and/or user environments 12. The system similarities 36 are calculated from test results of system environments 35. For example, the system similarities 36 can include system environment names 1, system environment names 2, and similarities. The system environment names 1 is the name of user environments 12. The system environment name 2 is name of the pilot environments 11 and the user environment 12 names. The similarities indicate how the results of test results are similar between the system environment name 1 and the system environment name 2.

FIG. 8 illustrates an example combinations 37 table in accordance with an example implementation. In an example implementation, the combinations 37 are calculated on the basis of the test results in pilot environments 11 and user environments 12. In an example, the combinations 37 can include abstract template names, catalog names, access pattern names, system environment names, and test results. The abstract template names, the catalog names, the access pattern names, the system environment names, and the test results are discussed in reference to FIG. 1-7.

Figure 9:
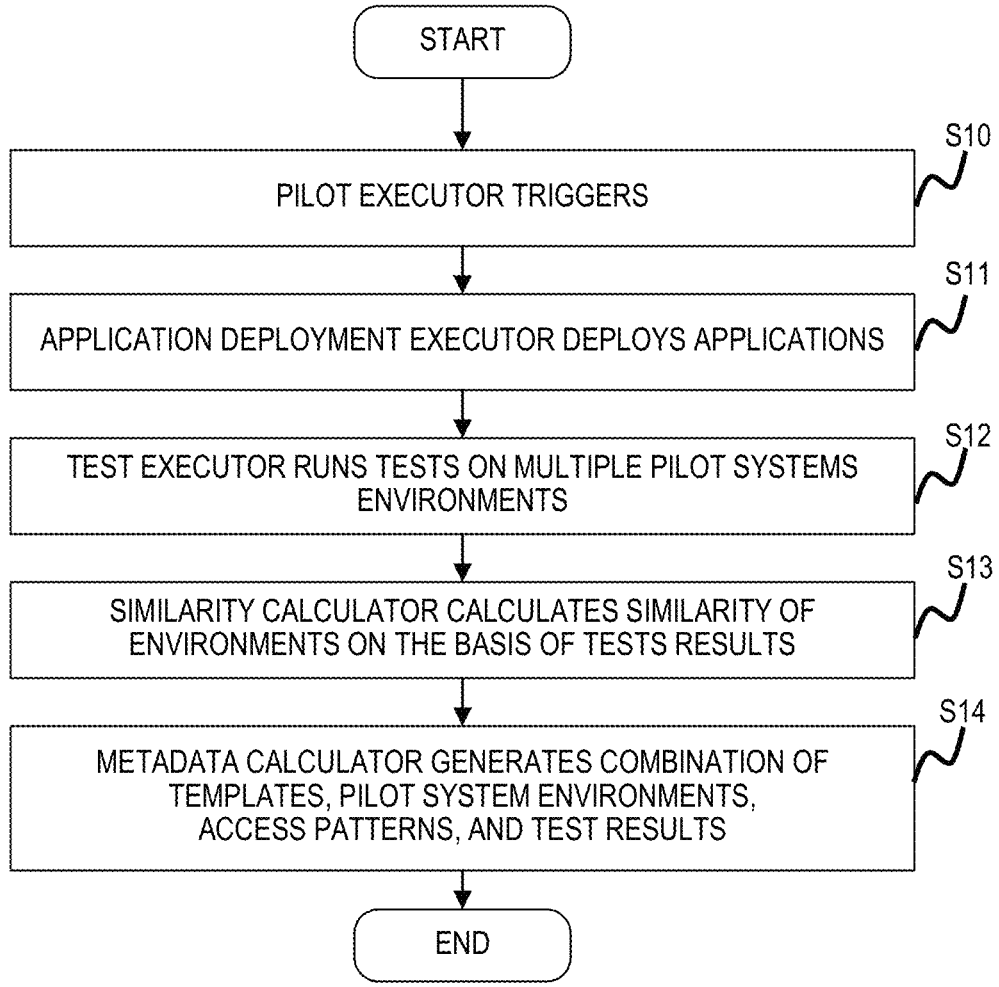
FIG. 9 illustrates an example flow of a learning phase for microservice validation in accordance with an example implementation.

FIG. 9 illustrates an example flow of a learning phase for microservice validation in accordance with an example implementation. During the learning phase, the microservice combination validator engine 10 tests abstract templates of applications to validate combinations of system environments and access patterns.

In step S10, the pilot executor 21 can start the learning phase as a batch process, ad-hoc, or on-demand. For example, the pilot executor 21 can be triggered based on a cron job (e.g., software utility job scheduler) at a pre-defined time, status change of a pilot environment 11, status change of a user environment 12, API requests from other systems, etc. The pilot executor 21 reads the application catalogs 31 and sends deploy requests to the application deployment executor 22. In response to a deploy request, the application deployment executor 22 can instantiate a number of pilot environments and deploy applications are using the catalogs 31 of pilot applications and non-pilot applications.

In step S11, the application deployment executor 22 deploys the applications. For example, the application deployment executor 22 can obtain source code and objects from application repositories 32 based on the application catalogs 31 received in sequence S11, and deploy them to multiple pilot environments 11-1~11-N. The application deployment executor 22 sends deployed application information (e.g., urls) to the test executor 23.

In step S12, the test executor 23 runs tests using a variety of access patterns 34 on the pilot environments 11-1~11-N. The test executor 23 stores the test results as system environments 35. Rather than just storing a basic list of environment characteristics, the stored system environments 35 include system environment names, catalog names, access pattern names, and test results that can be re-used to accurately determine compatibility of combinations with similar environments.

In step S13, the similarity calculator 30 uses the system environments 35 to calculate similarity of environments on the basis of test results. Calculated similarity values associated with a combination is stored in the system similarities 36 repository. In an example implementation, the similarities can be calculated by the percentage of consistence of test item such as Max_Number_of_entry_in_message_Queue and Number_of_entry_in_NoSQL as described in further in FIG. 6.

In step S14, the metadata calculator 24 creates a descriptor of structural metadata for each combination using the abstract template 33, system similarities 36, and system environments 35 associated with a pilot environment.

The metadata calculator 24 stores each tested combination in the combinations 37 repository. In an example implementation, a stored combination includes test results for deployed pilot system environment with the abstract template, the pilot system environment, and the access pattern. In an example implementation, permutations of different application systems are instantiated in the pilot environments 11 to validate the operability of different configurations and test performances of combinations for different access patterns 34.

Figure 10:
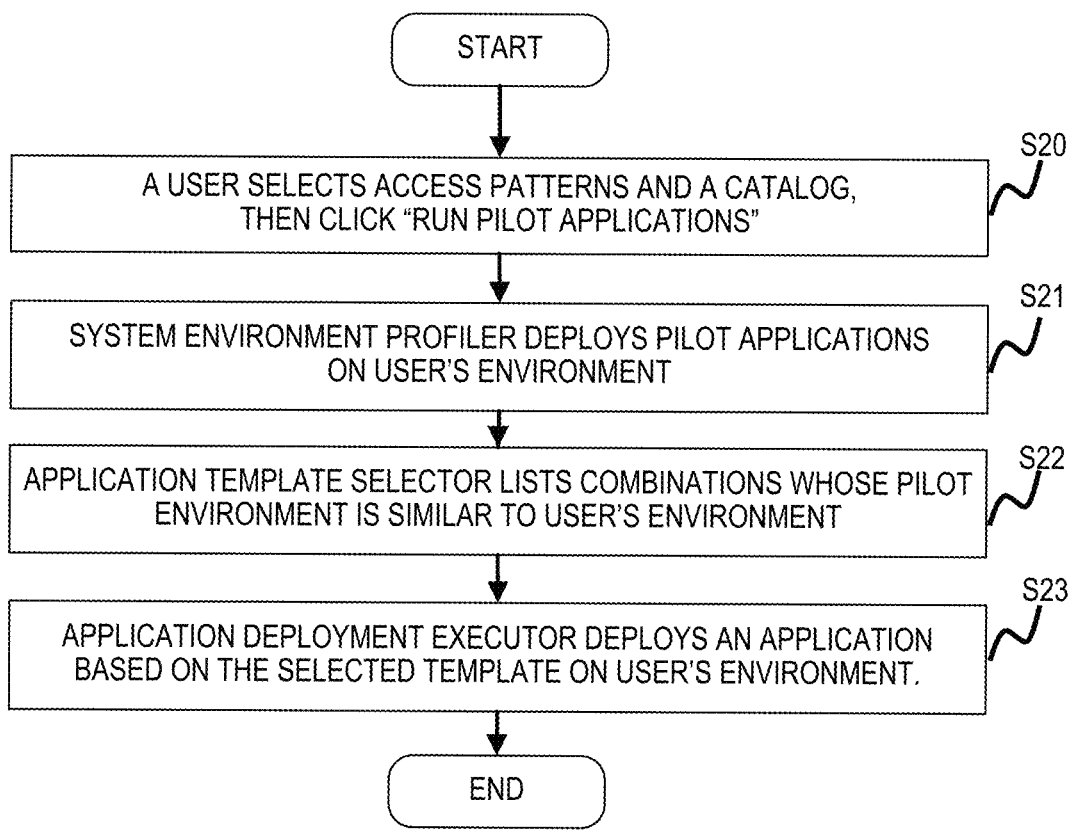
FIG. 10 illustrates an example flow of an action phase for microservice validation in accordance with an example implementation.

FIG. 10 illustrates an example flow of an action phase for microservice validation in accordance with an example implementation. The action phase can be initiated by a user via the user console 25 as described further in FIG. 2. The action phase selects combinations 37 with application templates that are similar to user's environment and selected access patterns. The capabilities of a user's environment impact the performance and operability of an installed application with microservices. The action phase validates the suitability of the combination of microservices prior to deployment in the user's environment.

In step S20, the user selects access patterns, a catalog and can then click "Run Pilot Applications" to start the validation process of the user's environment with the combinations 37 that are similar. Clicking "Run Pilot Applications" via the user console 25 triggers system environment profiler 26 to analyze the user's environment using pilot applications.

In step S21, the system environment profiler 26 uses the abstract templates 33 application catalogs 31 to deploy pilot applications on the user's environment. The abstract templates 33 identify catalogs as discussed in FIG. 4. The application catalogs 31 identify a catalog name, definitions, and test code repository link as discussed in FIG. 3. In an example implementation, the system environment profiler 26 reads one or more list of pilot applications in application catalogs 31 based on the user selected catalog. The system environment profiler 26 sends deploy requests to the application deployment executor 22

In response to the deploy requests, application deployment executor 22 deploys pilot applications in the user environment 12 as the deployment environments (e.g., 40A, 40B, 40C.). Application deployment executor 22 determines the deployed applications based on the catalogs of pilot applications. The deployed pilot applications are tested in the user's environment 12 to determine system similarities between the user's environment and combinations 37. Testing the deployed pilot applications can be carried out using S11, S12, S13, and S14 as described in FIG. 9.

In an example implementation, the application deployment executor 22 deploys the pilot applications in the user's environment, the test executor 23 runs tests using one or more access patterns 34 on the user's environments 12, the similarity calculator 30 uses the test results to calculate similarity of environments, and the metadata calculator 24 creates a descriptor of structural metadata for the user's environment with the deployed pilot application.

In step S22, the application template selector 27 uses combinations 37 and lists combinations to locate one or more abstract templates that match the abstract template selected by user in S20. A set of validation information is presented in the user deployment pane 252 of user console 25. The validation information includes a similarity value indicating the similarity between the tested pilot environment and the user's environment 12.

A catalog with successful test results that has a high similarity value with the user's environment indicates a validated application that can be deployed in the user's environment 12 with confidence. The user can filter, sort, rank, etc. the results and review the validated combinations that compatible with the user's environment 12. Further, the validation information indicates whether the combination with the high similarity value and successful test results is operable with the access pattern for the user's environment 12.

Multiple combinations can be validated as compatible with the user's environment and one or more optimal combination can be identified after the user's environment is instantiated. For example, open source based microservices may be combinable and installed successfully in a user environment but a different version of the microservices can be combined and result in better performance and/or stability.

The validation information also identifies failed combinations so the user avoid attempting to deploy an incompatible or sub-optimal application that the causes costs and time to troubleshoot or reconfiguring the user's environment 12. Combinations with failed test results can be avoided and the user may review the test logs to identify whether a resource or parameter can be adjusted that may change the results.

For example, an open source based microservice may use a TCP port which is not compatible with a corporate proxy. Deploying the open source based microservice can cause connections to fail and time out. The validation information can be used to select a validated combination with open source based microservices that are indicated as compatible with the corporate proxy.

In step S23, the user can select one of the catalogs from the lists in the set of validation information on the user deployment pane 252. The selected catalog, via the user console 25, triggers the application deployment executor 22 to deploy an application based on the selected catalog to the user's environment 12. Deploying validated combination of microservices improves performance, saves costly down time, and avoids intensive troubleshooting or reconfiguration.

For example, the user can review the validation information that indicates catalog 3 in Pilot_environment_1 is 90% similar to the user's environment 12, the test results indicate deploying applications associated with catalog 3 were successful with both Access Pattern 1 and Pattern 2. In response to the user selecting catalog 3 to deploy the application associated with catalog 3 in the user's environment 12.

Figure 11:
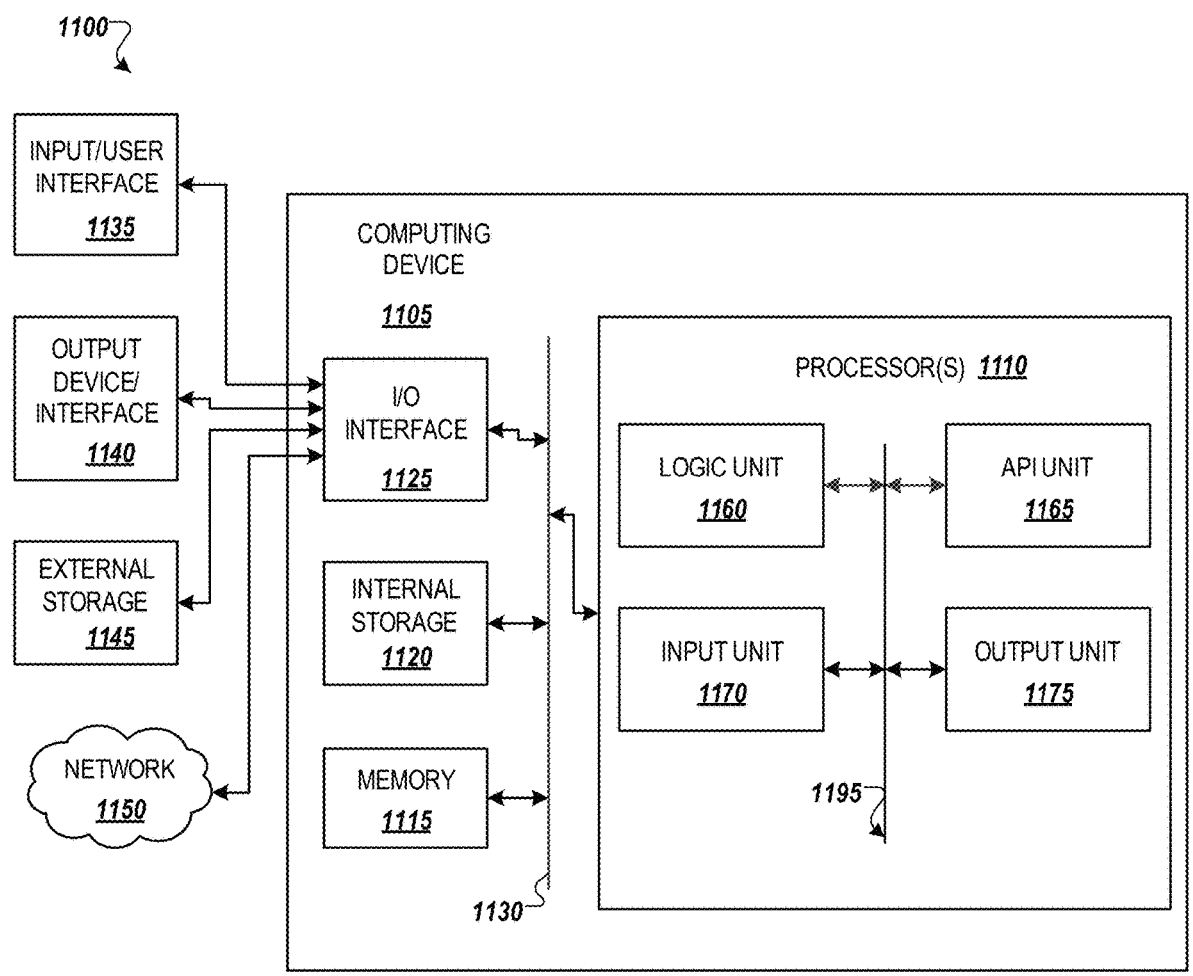
FIG. 11 illustrates an example computing environment with an example computer device suitable for use in some example implementations.

FIG. 11 illustrates an example computing environment with an example computer device suitable for use in some example implementations, such as a microservice combination validation 10 as illustrated in FIG. 1. Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105. I/O interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the predictions described in example implementations. In an example implementation involving a management system configured to microservice validation, as illustrated in the flow diagram of FIG. 9-10.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "determining," "calculating," "deploying," "providing," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Aspects of the present disclosure include a method to validate and deploy a microservice that optimize performance with a user environment. In an example implementation, the method calculates a plurality of similarities between a user environment and multiple pilot environments from application deployment test results. The test results are based on compatibility of catalogs of applications with each of the pilot environments. A list is presented with one or more of the catalogs of applications that are indicated as compatible and similar to the user environment based on the calculated similarities. The user can select catalog from the list that is deployed in the user environment.

An example implementation includes determining the application deployment test results during the learning phase by obtaining source code and objects for applications from the catalogs of applications from an application repository, deploying multiple pilot environments with the applications from the catalogs of applications, testing the applications for each of the pilot environments with one or more access patterns, and determining a pilot similarity between the multiple pilot environments based on the test results.

In an example implementation, processor 1105 is configured to calculate a plurality of similarities between a user environment and multiple pilot environments from application deployment test results, wherein the test results are based on compatibility of catalogs of applications with each of the pilot environments, present a list of one or more of the catalogs of applications indicated as compatible and similar to the user environment based on the calculated similarities, and deploy a selected catalog from the list in the user environment as illustrated in FIG. 10 steps S21, S22, S23.

The processor 1105 can be configured to obtain source code and objects for applications from the catalogs of applications from an application repository; deploy multiple pilot environments with the applications from the catalogs of applications; test the applications for each of the pilot environments with one or more access patterns; determine a pilot similarity between the multiple pilot environments based on the test results; and store the test results as illustrated in FIG. 9 steps S11, S12, S13.

In an example, the processor 1105 can be configured to store the test results by generating metadata for each pilot environment that indicates an abstract template, pilot similarities, an access pattern, and the pilot environment associated with the testing as illustrated in FIG. 6 and FIG. 9 steps S14. The processor 1105 can be configured to the use a pilot application as the catalog of applications as illustrated in FIG. 8.

The processor 1105 is configured to deploy one or more pilot applications in the user environment; and test the one or more pilot applications in the user environment with one or more access patterns as illustrated in FIG. 1, FIG. 2 and FIG. 10 steps S21. The processor 1105 is configured to calculate the plurality of similarities comprises determining a percentage of consistence for a test item for the test results between the user environment and the multiple pilot environments as illustrated in FIG. 1 and FIG. 9 steps S13.

The processor 1105 is configured to present a user interface to filter the list of the one or more of catalogs of applications, wherein the list further comprises, for each application, an access pattern, a system environment name, the calculated similarity, and test results associated the application as illustrated in FIG. 2. The processor 1105 is configured to present the list of validation information with applications associated with pilot environments indicated as similar to the user environment and applications indicated as compatible based on successful test results as illustrated in FIG. 2 and FIG. 4. The processor 1105 is configured to determine compatibility of an application with the associated pilot environment using a test repository as illustrated in FIG. 3 In an example, The processor 1105 is configured to rank the applications with the associated pilot environments based on the calculated similarities as illustrated in FIG. 2.

The processor 1105 is configured to present the list including an access pattern, a system environment name, the calculated similarity, and test results associated the application for each application as illustrated in FIG. 2 and FIG. 8. The processor 1105 is configured to calculate the plurality of similarities is in response to a user selected access pattern as illustrated in FIG. 2 and FIG. 10 steps S20. The processor 1105 is configured to determine the catalog of pilot applications based on user selected access patterns and abstract templates as illustrated in FIG. 2 and FIG. 10 steps S20.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for validating and deploying microservices comprising:
  calculating a plurality of similarities between a user environment and multiple pilot environments from application deployment test results, wherein the test results are based on compatibility of catalogs of applications with each of the pilot environments;
  presenting a list of one or more of the catalogs of applications indicated as compatible and similar to the user environment, the list of the one or more catalogs of applications determined based on the calculated similarities and a selected abstract template indicative of high level application systems to be deployed;
  deploying a selected catalog from the list in the user environment;
  wherein the application deployment test results are based on:
    obtaining source code and objects for applications from the catalogs of applications from an application repository;
    deploying multiple pilot environments with the applications from the catalogs of applications;
    testing the applications for each of the pilot environments with one or more access patterns;
    determining a pilot similarity between the multiple pilot environments based on the test results; and
    storing the test results;
  wherein storing the test results comprises generating metadata for each pilot environment that indicates the abstract template, pilot similarities, an access pattern, and the pilot environment associated with the testing.

2. The method of claim 1, wherein the test results use a pilot application as the catalog of applications.

3. The method of claim 1, wherein application deployment test results for the user environment are based on
  deploying one or more pilot applications in the user environment; and
  testing the one or more pilot applications in the user environment with one or more access patterns.

4. The method of claim 3, wherein calculating the plurality of similarities comprises determining a percentage of consistence for a test item for the test results between the user environment and the multiple pilot environments.

5. The method of claim 3, wherein the list comprises applications indicated as compatible based on successful test results.

6. The method of claim 3, wherein the list comprises applications associated with pilot environments indicated as similar to the user environment.

7. The method of claim 6, wherein the list ranks the applications with the associated pilot environments based on the calculated similarities.

8. The method of claim 3, wherein the catalog of pilot applications is determined based on user selected access patterns and abstract templates.

9. The method of claim 1, wherein the list of the one or more of catalogs of applications further includes, for each application, an access pattern, a system environment name, the calculated similarity, and test results associated the application.

10. The method of claim 1, wherein the compatibility of an application with the associated pilot environment is determined using a test repository.

11. The method of claim 1, wherein calculating the plurality of similarities is in response to a user selected access pattern.

12. A system comprising:
  a memory;
  a processor coupled to the memory configured to:
  calculate a plurality of similarities between a user environment and multiple pilot environments from application deployment test results, wherein the test results are based on compatibility of catalogs of applications with each of the pilot environments;
  present a list of one or more of the catalogs of applications indicated as compatible and similar to the user environment, the list of the one or more catalogs of applications determined based on the calculated similarities and a selected abstract template indicative of high level application systems to be deployed; and
  deploy a selected catalog from the list in the user environment;
  wherein the application deployment test results are based on:
    obtaining source code and objects for applications from the catalogs of applications from an application repository;
    deploying multiple pilot environments with the applications from the catalogs of applications;
    testing the applications for each of the pilot environments with one or more access patterns;
    determining a pilot similarity between the multiple pilot environments based on the test results; and
    storing the test results;
  wherein storing the test results comprises generating metadata for each pilot environment that indicates the abstract template, pilot similarities, an access pattern, and the pilot environment associated with the testing.

13. The system of claim 12, wherein application deployment test results for the user environment are based on
  deploying one or more pilot applications in the user environment; and
  testing the one or more pilot applications in the user environment with one or more access patterns.

14. The system of claim 12, further comprising a user interface to filter the list of the one or more of catalogs of applications, wherein the list further comprises, for each application, an access pattern, a system environment name, the calculated similarity, and test results associated the application.

15. A non-transitory computer-readable medium storing instructions including a processing device configured to:
  calculate a plurality of similarities between a user environment and multiple pilot environments from application deployment test results, wherein the test results are based on compatibility of catalogs of applications with each of the pilot environments;
  present a list of one or more of the catalogs of applications indicated as compatible and similar to the user environment, the list of the one or more catalogs of applications determined based on the calculated similarities and a selected abstract template indicative of high level application systems to be deployed;

and deploy a selected catalog from the list in the user environment;

wherein the application deployment test results are based on:

obtaining source code and objects for applications from the catalogs of applications from an application repository;

deploying multiple pilot environments with the applications from the catalogs of applications;

testing the applications for each of the pilot environments with one or more access patterns;

determining a pilot similarity between the multiple pilot environments based on the test results; and storing the test results;

wherein storing the test results comprises generating metadata for each pilot environment that indicates the abstract template, pilot similarities, an access pattern, and the pilot environment associated with the testing.

16. The non-transitory computer-readable medium of claim 15, wherein application deployment test results for the user environment are based on deploying one or more pilot applications in the user environment; and testing the one or more pilot applications in the user environment with one or more access patterns.

* * * * *